US012724788B2

(12) United States Patent
Mudumba et al.

(10) Patent No.: US 12,724,788 B2
(45) **Date of Patent: *Sep. 1, 2026**

(54) CLEANING AND ORGANIZING SCHEMALESS SEMI-STRUCTURED DATA FOR EXTRACT, TRANSFORM, AND LOAD PROCESSING

(71) Applicant: Capital One Services, LLC, McLean, VA (US)

(72) Inventors: Venkateshwara Mudumba, Glen Allen, VA (US); Govind Pande, Chantilly, VA (US); Angshuman Bhattacharya, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,856

(22) Filed: Feb. 20, 2024

(65) Prior Publication Data

US 2024/0193176 A1 Jun. 13, 2024

Related U.S. Application Data

(63) Continuation of application No. 17/810,715, filed on Jul. 5, 2022, now Pat. No. 11,928,125.

(51) Int. Cl.

| | |
|---|---|
| ***G06F 16/25*** | (2019.01) |
| ***G06F 16/21*** | (2019.01) |
| ***G06F 16/28*** | (2019.01) |

(52) U.S. Cl.
CPC .......... *G06F 16/254* (2019.01); *G06F 16/211* (2019.01); *G06F 16/258* (2019.01); *G06F 16/284* (2019.01)

(58) Field of Classification Search
CPC .... G06F 16/254; G06F 16/258; G06F 16/211; G06F 16/284
See application file for complete search history.

(56) References Cited

U.S. PATENT DOCUMENTS

| | | | | |
|---|---|---|---|---|
| 10,911,379 | B1 * | 2/2021 | Bray | H04L 51/18 |
| 2015/0052157 | A1 * | 2/2015 | Thompson | G06F 16/335 707/754 |

(Continued)

OTHER PUBLICATIONS

International Search Report and Written Opinion for Application No. PCT/US2023/069145, mailed on Oct. 4, 2023, 11 Pages.

*Primary Examiner* — Kuen S Lu
(74) *Attorney, Agent, or Firm* — Harrity & Harrity, LLP

(57) ABSTRACT

In some implementations, a system may obtain, from a first data repository, a first dataset that includes event data associated with a generic schema. The system may infer an event-specific schema that defines an organizational structure for the event data based on common attributes identified among a plurality of events included in the event data using one or more data analytics functions. The system may store, in a second data repository, a second dataset in which the event data is partitioned based on the organizational structure defined by the event-specific schema. The system may generate a third dataset that includes a subset of the event data included in the second dataset that satisfies one or more registration parameters related to an extract, transform, load (ETL) use case. The system may provide the third dataset to an ETL system configured to process the third dataset based on the ETL use case.

20 Claims, 5 Drawing Sheets

(56) References Cited

U.S. PATENT DOCUMENTS

| | | | | |
|---|---|---|---|---|
| 2017/0206256 | A1* | 7/2017 | Tsirogiannis | G06F 16/22 |
| 2018/0150529 | A1* | 5/2018 | Mcpherson | G06F 9/542 |
| 2019/0095599 | A1* | 3/2019 | Iliofotou | G06F 16/337 |
| 2019/0158524 | A1* | 5/2019 | Zadeh | H04L 61/103 |
| 2020/0341951 | A1* | 10/2020 | Oberhofer | H04L 9/50 |
| 2022/0108262 | A1* | 4/2022 | Cella | G05B 17/02 |
| 2023/0342342 | A1* | 10/2023 | Pletcher | G06F 16/212 |
| 2024/0012827 | A1 | 1/2024 | Mudumba et al. | |

* cited by examiner

CLEANING AND ORGANIZING SCHEMALESS SEMI-STRUCTURED DATA FOR EXTRACT, TRANSFORM, AND LOAD PROCESSING

RELATED APPLICATION

This application is a continuation of U.S. patent application Ser. No. 17/810,715, filed Jul. 5, 2022, which is incorporated herein by reference in its entirety.

BACKGROUND

In computing, extract, transform, and load (ETL) generally refers to procedures to copy data from one or more source systems into one or more destination (or sink) systems that represent the data in a different manner and/or in a different context than the source system(s). For example, in an ETL system, extraction typically includes importing structured and/or unstructured data from homogeneous or heterogeneous data sources, transformation includes processing and converting the data (e.g., using a data cleansing technique) into a format and/or structure that is suitable for querying and further analysis, and loading includes inserting the transformed data into a final target system, such as an operational data store, a data mart, or a data warehouse. Accordingly, an ETL system may be used to integrate data that may be developed and supported by different vendors or hosted on separate computer hardware, enforce data quality and consistency standards such that data from separate sources can be used together, and/or deliver data in a presentation-ready format to enable developers to build applications around the data and/or enable end users to consume or otherwise utilize the data.

SUMMARY

Some implementations described herein relate to a system for cleaning and organizing event data. The system may include one or more memories and one or more processors communicatively coupled to the one or more memories. The one or more processors may be configured to obtain, from a first data repository, a first dataset that includes event data associated with a generic schema. The one or more processors may be configured to infer an event-specific schema that defines an organizational structure for the event data based on common attributes that are identified among a plurality of events included in the event data using one or more data analytics functions. The one or more processors may be configured to store, in a second data repository, a second dataset in which the event data is partitioned based on the organizational structure defined by the event-specific schema. The one or more processors may be configured to generate a third dataset that includes a subset of the event data included in the second dataset that satisfies one or more registration parameters related to an ETL use case. The one or more processors may be configured to provide the third dataset to an ETL system configured to process the third dataset based on the ETL use case.

Some implementations described herein relate to a method for cleaning and organizing event data for ETL processing. The method may include obtaining, by an event log management system, a first dataset from a first data repository, where the first dataset includes event data associated with a generic schema, and where the generic schema is associated with a data format that supports schema variability among a plurality of applications that generated the event data. The method may include inferring, by the event log management system, an event-specific schema that defines an organizational structure for the event data based on common attributes that are identified among a plurality of events included in the event data using one or more data analytics functions. The method may include storing, by the event log management system, a second dataset in a second data repository, where the second dataset partitions the event data based on the organizational structure defined by the event-specific schema. The method may include generating, by the event log management system, a third dataset that includes a subset of the event data included in the second dataset that satisfies one or more registration parameters related to an ETL use case. The method may include providing, by the event log management system, the third dataset to an ETL system configured to process the third dataset based on the ETL use case.

Some implementations described herein relate to a non-transitory computer-readable medium that stores a set of instructions. The set of instructions, when executed by one or more processors of a system, may cause the system to obtain, from a first data repository, a first dataset that includes event data associated with a generic schema. The set of instructions, when executed by one or more processors of the system, may cause the system to infer an event-specific schema that defines an organizational structure for the event data based on common attributes that are identified among a plurality of events included in the event data using one or more data analytics functions. The set of instructions, when executed by one or more processors of the system, may cause the system to store, in a second data repository, a second dataset in which the event data is partitioned based on the organizational structure defined by the event-specific schema. The set of instructions, when executed by one or more processors of the system, may cause the system to generate a third dataset that includes a subset of the event data included in the second dataset that satisfies one or more registration parameters related to an ETL use case. The set of instructions, when executed by one or more processors of the system, may cause the system to provide the third dataset to an ETL system configured to process the third dataset based on the ETL use case. The set of instructions, when executed by one or more processors of the system, may cause the system to generate, based on the one or more registration parameters related to the ETL use case, an event intelligence report that includes information related to the common attributes that are identified among the plurality of events and information related to the event-specific schema that defines the organizational structure for the event data.

DETAILED DESCRIPTION

Figure 1A:
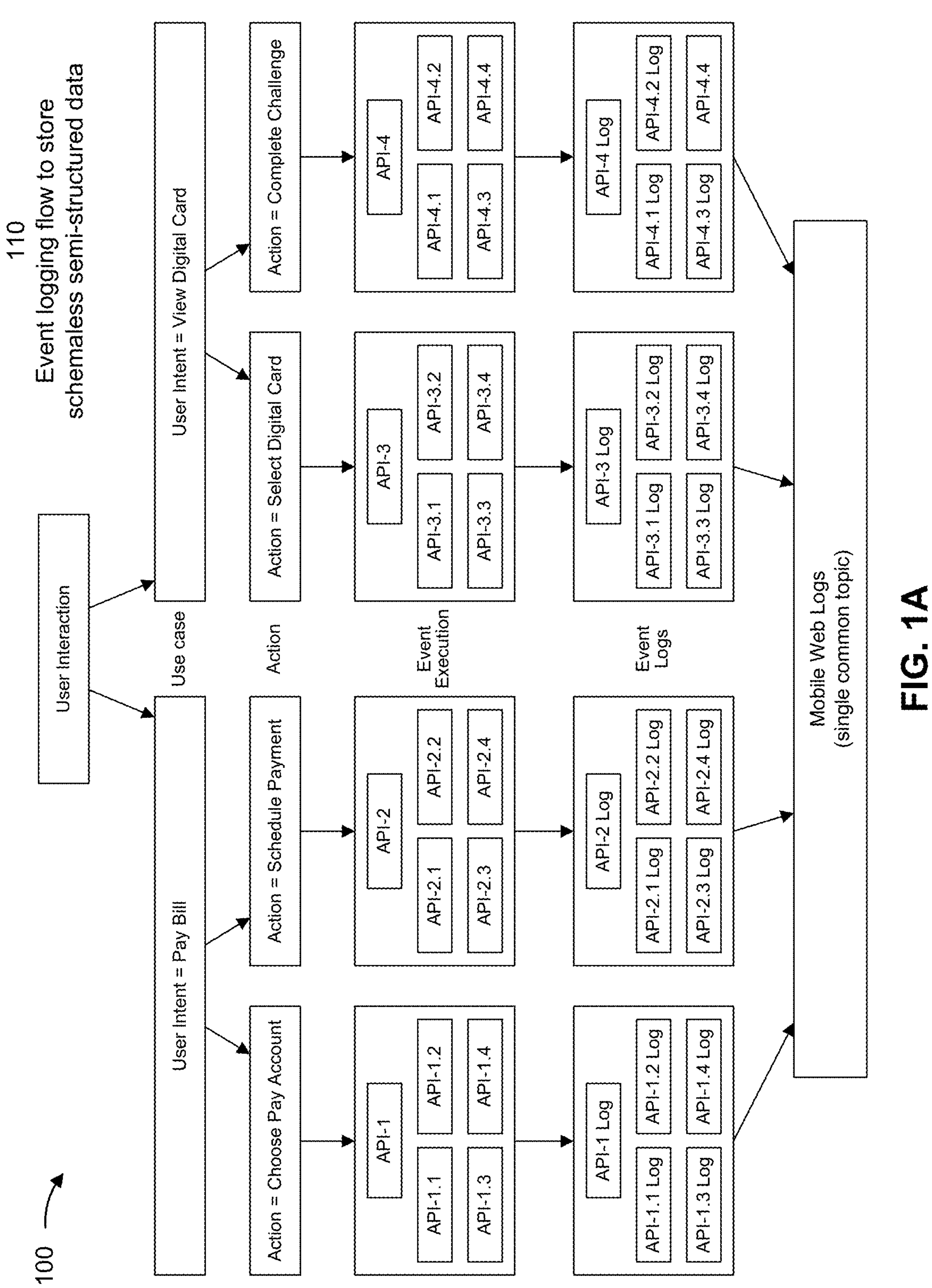
FIGS. 1A-1B are diagrams of an example implementation relating to cleaning and organizing schemaless semi-structured data for ETL processing, in accordance with some embodiments of the present disclosure.

The following detailed description of example implementations refers to the accompanying drawings. The same reference numbers in different drawings may identify the same or similar elements.

Extract, transform, and load (ETL) tools serve an important role in data integration strategies by allowing organizations to gather data from multiple (often heterogeneous) data sources and consolidate the data into a single, centralized location. For example, an ETL tool may be configured to extract raw structured data and/or raw unstructured data from various data sources (e.g., databases, cloud and/or on-premises environments, data warehouses, customer relationship management systems, and/or other sources), transform the raw data into a format compatible with a destination system (e.g., using data cleansing, standardization, deduplication, verification, sorting, and/or other techniques), and then load the transformed data to the destination system for further use. Because an ETL tool is often used to extract, transform, and load large data volumes, the three ETL phases may execute in a pipeline. For example, while one or more processes are extracting raw data from the data sources, one or more transformation processes may execute to transform raw data that has already been extracted, and one or more loading processes may execute to load data that has already been transformed into the destination systems without waiting for the extraction and/or transformation process(es) to finish.

One challenge that may arise in an ETL context is that there are no comprehensive and reusable solutions to process schemaless data. For example, structured data generally includes data that has a well-defined organizational structure, conforms to a data model, follows a persistent order, and/or has other characteristics that make the data easy to access and use by data analytics platforms that may use an ETL system as a front-end to prepare datasets related to certain data analytics use cases. However, in order to work, structured data needs to be heavily formatted and shaped to fit into a fixed tabular structure used in a relational database, where a schema is used to describe every functional element (e.g., tables, rows, columns, views, indexes, and/or relationships, among other examples). As a result, although the schema associated with a structured dataset simplifies ETL processing, undefined details related to the structured data may be sacrificed when the structured data is saved to the relational database and/or valuable information related to the structured data may need to be stored outside the relational database. In some cases, schemaless data can be used to avoid the up-front constraints that are imposed on structured data, where schemaless data may be stored according to a generic schema (e.g., a JavaScript Object Notation (JSON) binary large object (blob) or string) that allows the schemaless data to have varying fields that are associated with different data types. In this way, schemaless data can offer various benefits over structured data associated with a well-defined schema, including greater flexibility over data types, an ability to accept any data type (including data types that may be developed in the future), no data truncation, and enhanced scalability and/or flexibility.

However, schemaless data is typically not used for data analytics purposes due to the lack of a comprehensive and reusable ETL solution to process schemaless data. For example, in a typical pattern, a data ecosystem may include many applications that are generating event logs to describe every action, application program interface (API) call, error, and/or other events that occur when the applications are executed, and each application typically uses a proprietary data format to represent the events. Accordingly, the event logs may be stored in a data repository as schemaless data, such as a generic string or blob, that is tolerant to schema variability. However, because the schemaless data is produced without a fixed schema, multi-context data all arrives at a single location without any clear tags or markers related to who owns the data, how to read the data, and/or how to make sense of the data, because there is no published schema and the schemaless data is all stored in a generic (e.g., JSON string or blob) format. As a result, the schemaless data cannot be loaded to a relational database because the schemaless data lacks an intrinsic logical organization and/or structure to enable querying or reporting, which prevents ETL solutions from processing or otherwise enabling data analytics for the schemaless data.

Some implementations described herein relate to techniques to clean and organize schemaless semi-structured data for ETL processing. For example, as described herein, schemaless semi-structured data may generally include data that is associated with a generic schema or otherwise lacks a formal schema to define a fixed tabular structure for a data model associated with a relational database or other data table, but nonetheless contains attributes (e.g., tags, markers, or other contextual elements) to separate semantic elements and/or enforce hierarchies of records and fields within the data. Accordingly, some implementations described herein may receive multi-context semi-structured data associated with a generic schema (e.g., a text format) and programmatically infer a schema that defines an organizational structure for the multi-context semi-structured data (e.g., by scanning a schemaless semi-structured dataset to identify common attributes among different data elements). In some implementations, the inferred schema (and specifically the organizational structure associated with the inferred schema) may then be used to segregate or otherwise partition the schemaless semi-structured dataset at one or more levels of granularity. In this way, some implementations described herein may use common properties among data elements included in a schemaless semi-structured dataset that may potentially have a very large data volume, and the inferred schema may be used to generate one or more query-friendly datasets that can be consumed in an ETL pipeline (e.g., provided to a data source that stores data to be extracted by an ETL system, transformed into a target data format, and loaded to a data sink where the data is exposed or otherwise made available for one or more data analytics use cases).

Figure 1B:
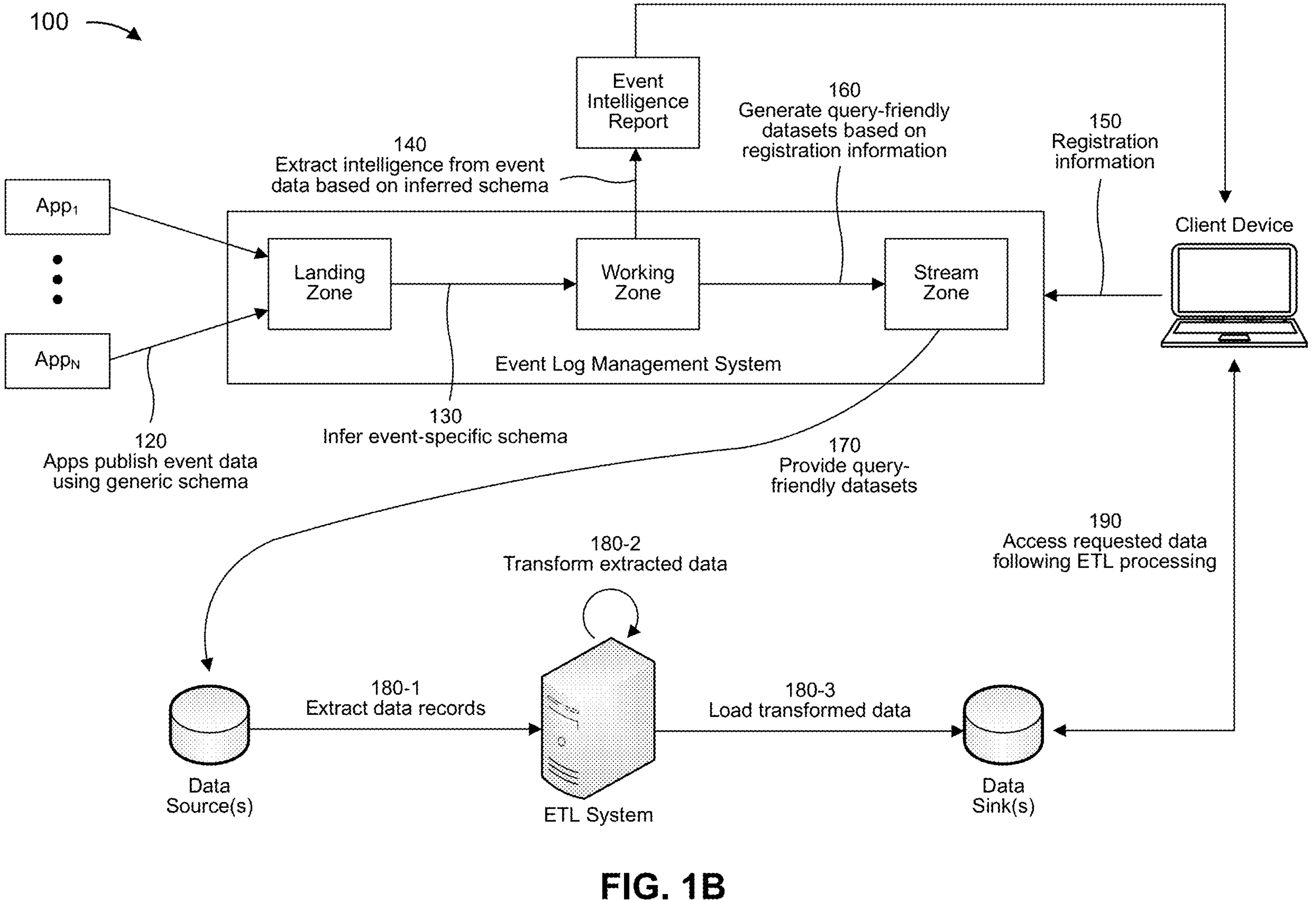

FIGS. 1A-1B are diagrams of an example 100 associated with cleaning and organizing schemaless semi-structured data for ETL processing. As shown in FIGS. 1A-1B, example 100 includes an event log management system, a client device, a data source, an ETL system, and a data sink. The event log management system, client device, data source, ETL system, and data sink are described in more detail in connection with FIG. 2 and FIG. 3.

Referring to FIG. 1A, reference number 110 illustrates an example event logging flow that may be used to generate and store schemaless semi-structured data. For example, the example event logging flow shown in FIG. 1A may represent a manner in which event logs are generated by one or more applications in a data ecosystem associated with a financial institution that offers various customer-facing tools, such as a website or a mobile application to manage one or more financial accounts or otherwise perform one or more financial activities. For example, the event logging flow shown in FIG. 1A may be used to generate event logs that represent artifacts related to user interactions with or actions performed by one or more applications that can be used to pay bills, view digital cards, or perform any other use case enabled in the data ecosystem associated with the financial institution (e.g., apply for a credit card, request or model a loan, shop through one or more partner entities, transfer funds, request a credit limit increase, and/or view a credit report, among other examples). Accordingly, although FIG. 1A illustrates an event logging flow associated with only two potential use cases, it will be appreciated that an actual data ecosystem may include many (e.g., tens, hundreds, or more) applications that may each be associated with many different use cases, which can result in an event logging flow generating a very large dataset based on the actions or operations performed in the data ecosystem. Furthermore, it will be appreciated that implementations described herein are not limited to applications associated with a financial institution, but are more generally applicable in any suitable data ecosystem where heterogeneous applications are used to generate schemaless semi-structured datasets.

As shown in FIG. 1A, at a topmost level, the event logging flow may begin with a user interacting with an application in the data ecosystem associated with the financial institution, where the application may be a mobile application, a website, or the like. As further shown, the user interaction may include an intent that may be mapped to a use case, such as a first use case to pay a bill or a second use case to view a digital card. As further shown, each use case that can potentially be mapped to the intent associated with the user interaction may be associated with one or more available actions. For example, in some implementations, the first use case to pay a bill may be associated with an action to choose an account to be used to pay the bill, an action to schedule a payment, and/or other suitable actions, and the second use case to view a digital card may be associated with an action to click or select a digital card, an action to complete a challenge to gain authorization to view the digital card, and/or other suitable actions. As further shown, each action may be associated with one or more API calls that are used to execute the corresponding action, and each API may generate a corresponding event log to capture data related to execution of the corresponding action. As further shown in FIG. 1A, the various event logs are all stored in a common data repository (e.g., a storage location for mobile web logs) under a single common topic (e.g., user interactions) despite lacking an explicit schema or other intrinsic logical organization that is common among the various event logs.

Accordingly, the lack of an explicit schema or other logical organization among the event logs stored in the common data repository produces an anti-pattern, whereby logging data that is aggregated from heterogeneous applications or other event sources in a data ecosystem may become overwhelming in volume and challenging to consume. For example, in the event logging flow shown in FIG. 1A, there are four API groups that each include five APIs configured to generate event logs related to actions carried out by the respective APIs, which results in twenty event logs that are produced by multiple heterogeneous sources being routed to a single common topic with a generic schema (e.g., a JSON string format, a JSON blob format, an Apache Avro format, or another suitable format tolerant to schema variability). In many cases, the event logs may each have a large number of attributes (e.g., several hundred or more) that are not traceable to the corresponding intent, which results in a high data volume that cannot be easily ingested and/or processed in an ETL pipeline. Furthermore, the high volume of event data has a low usability, because there is no clear user context, user action context, or other context to link and aggregate the high volume of event data. Accordingly, as described in further detail herein, some implementations may provide a comprehensive and reusable ETL solution to process schemaless data that may be generated in a data ecosystem. For example, as described herein with respect to FIG. 1B, some implementations may organize one or more datasets that include event data associated with a generic schema into a query-friendly dataset (e.g., a dataset that is compatible with a database query format used in a relational database management system), whereby the query-friendly dataset can then be loaded to a suitable relational database management system (e.g., Snowflake).

More particularly, referring to FIG. 1B, and as shown by reference number 120, a plurality of applications (shown in FIG. 1B as $App_1$ through $App_N$) may publish event data associated with a generic schema to a first data repository (shown in FIG. 1B as "Landing Zone") included in the event log management system. In some implementations, as described herein, the applications may generate the event data using heterogeneous data formats to represent events such as API calls, clickstream data, errors, and/or other suitable actions or occurrences in a data ecosystem associated with the various applications. For example, in some implementations, the generic schema may include a JSON string format, a JSON blob format, an Apache Avro format, and/or any other suitable format that is tolerant to schema variability (e.g., a text format that lacks an explicit schema or intrinsic logical organization that follows a fixed tabular structure that can be used to perform database queries and/or generate database reports). Accordingly, when the various applications publish the event data to the landing zone data repository, the event data may be stored without a logical organization (e.g., all event logs may be bundled or otherwise stored together in the landing zone data repository). In this way, applications that generate event logs can be easily onboarded onto the event log management system, as each application may publish the event data using the generic schema (e.g., a schemaless format). Furthermore, using the generic schema may provide greater flexibility over data types that are used in different applications, may allow the landing zone data repository to accept any existing or future-developed data type, and/or may avoid data truncation because no changes are made to the underlying event data, among other examples.

As further shown in FIG. 1B, and by reference number 130, the event log management system may obtain, from the landing zone data repository, a dataset to be converted from the generic schema to a query-friendly data format, and may infer an event-specific schema that defines an organizational structure for the dataset to be converted based on common attributes that the event log management system identifies among events included in the dataset. In some implementations, the event logs that the applications publish to the landing zone data repository may be associated with a relatively short-term retention time (e.g., one day), and may be partitioned within the landing zone data repository according to a time-based parameter (e.g., by date) to enable the event log management system to periodically obtain relatively small datasets to be converted to the query-friendly data format or otherwise organized to enable the datasets to be loaded into a relational database management system. For example, in some implementations, the event log management system may scan all of the schemaless data included in a dataset that is pulled from the landing zone data repository, and may then logically organize the dataset based on event logs or event data having one or more common attributes (e.g., the same event name). For example, in a case where the dataset includes API events with the names E1, E2, and E3 bundled or otherwise stored in a common data location (e.g., a folder), the event log management system may organize the API events into event-specific folders that partition the API events according to the common attribute(s) (e.g., storing API events with the name E1 in a first storage location, API events with the name E2 in a second storage location, and API events with the name E3 in a third storage location).

In some implementations, after the schemaless dataset has been obtained from the landing zone data repository and appropriately partitioned based on the common attribute(s) identified among the events included in the dataset, the event log management system may then infer a schema associated with each respective group of events that share one or more common attributes. For example, in some implementations, the event log management system may use one or more data analytics functions (e.g., associated with an Apache Spark framework) to derive or otherwise infer the schema associated with each partition or group of events. For example, as described herein, the schemaless data that the applications publish to the landing zone data repository may be classified as semi-structured data, meaning that the schemaless data contains markers, tags, or other information to separate semantic elements and define hierarchies and relationships among data elements despite not following a tabular structure associated with a data model used in a relational database or other data table. For example, as described herein, the schemaless data may be associated with one or more JSON formats that use human-readable text to represent data objects that include attribute-value pairs. Additionally, or alternatively, the schemaless data may be associated with any other suitable semi-structured data format, such as Extensible Markup Language (XML) or other markup languages, email, and/or electronic data interchange (EDI), among other examples. Accordingly, because the schemaless data is semi-structured, the schemaless data may have a self-describing structure, including tags, delimiters, text, and/or other properties that can be used to translate the schemaless data into relational tables, columns, rows, or the like. In some implementations, the event log management system may use the data analytics functions to infer the schema associated with each partition or group of events based on common properties associated with each partition or group of events and/or based on any tags, delimiters, markers, or other elements that indicate an organizational structure to the schemaless semi-structured data associated with each partition or group of events.

In some implementations, after inferring the event-specific schema associated with each partition or group of events, the event log management system may store, in a second data repository (e.g., shown in FIG. 1B as a "Working Zone"), a dataset in which the event data is partitioned based on the organizational structure defined by the event-specific schema. For example, the event log management system may convert the event log data obtained from the landing zone data repository from a string or other text-based format to a structured data format that can be used to encapsulate different data types (e.g., integers, strings, Boolean values, floating point numbers, or the like). In some implementations, the dataset that is stored in the working zone data repository may be associated with a relatively short-term retention time (e.g., seven days) that may be longer than the retention time of the landing zone data repository, which may allow the working zone data repository to accumulate schemaless data that has been organized or otherwise partitioned based on an inferred schema. In this way, the organization of the schemaless data based on the inferred schema may enable the working zone data repository to be programmatically queried to retrieve any suitable data of interest (e.g., for an ETL use case).

For example, as shown by reference number 140, the event log management system may extract intelligence associated with the event log data based on the inferred schema(s), which may be used to generate one or more event intelligence reports that are provided to the client device. For example, the event intelligence report may expose information related to an event and schema inventory associated with the schemaless semi-structured data received from the various applications, where the event and schema inventory may include event names, partitioning criteria, source application identifiers, host identifiers, schema information (e.g., the inferred schema associated with a partition or group of events and/or information related to the common attributes that were identified and used to infer the corresponding schema), or the like. In this way, a user of the client device may use the information included in the event intelligence report to configure one or more ETL use cases. For example, as shown by reference number 150, the client device may indicate one or more registration parameters to define an ETL use case (e.g., indicating parameters to combine events in a certain file format to create a specific dataset, mapping out certain fields to create a use-case-specific dataset, or otherwise specifying one or more user-driven registration parameters to define a use case of interest based on the information included in the event intelligence report).

In this way, as shown by reference number 160, the event log management may generate one or more query-friendly datasets (e.g., datasets having a tabular structure or other format that can be loaded into a relational database) that satisfy the registration parameters provided by the client device. For example, as shown, the query-friendly datasets may be stored in a third data repository (e.g., shown in FIG. 1B as a "Stream Zone" data repository) that is associated with a long-term retention time (e.g., several months or years) such that the query-friendly datasets may accumulate event log data over time. As further shown by reference number 170, the query-friendly datasets may be streamed to a data source repository where the query-friendly datasets can be ingested into an ETL pipeline. For example, after the schemas have been inferred for the schemaless semi-structured data and the schemas have been used to organize the schemaless semi-structured data into query-friendly datasets, the query-friendly datasets may be loaded to a relational database management system (e.g., Snowflake) associated with the data source, such that the ETL system can then process the query-friendly dataset in a context of one or more ETL use cases.

For example, in some implementations, the ETL system may be configured (e.g., by a user of the client device) to execute one or more ETL jobs associated with a desired ETL use case. For example, in some implementations, each ETL job configured in the ETL system may be associated with configuration information that defines one or more data sources from which the ETL system is to extract data records, rules that define how the data records are to be transformed from a source format to a target format, and one or more data sinks into which the data records are to be loaded after the appropriate transformations have been applied. Furthermore, in some implementations, the ETL pipeline may include one or more intermediate data sources in a data flow from the one or more data sources to the one or more data sinks. For example, in some implementations, the one or more data sinks may generally store the data records to be extracted in one or more tables, and data records that are extracted may be stored in one or more tables associated with one or more intermediate data sources while transformations are applied to the data records and/or prior to loading the transformed data records into the one or more data sources. Additionally, or alternatively, the ETL pipeline may include various dependencies, nesting relationships, and/or other groupings for various tables that store data records at any stage in the ETL pipeline (e.g., at extract, transform, and/or load stages).

Accordingly, as described herein, the ETL monitoring platform may configure a particular ETL pipeline that may be used for one or more ETL jobs by indicating various settings associated with the ETL pipeline. For example, in some implementations, the settings associated with the ETL pipeline may include one or more connection settings to define parameters that the ETL system uses to connect to the one or more data sources (which may include the query-friendly datasets generated by the event log management system), extraction settings to define queries, commands, and/or other parameters that the ETL system uses to extract the data records from the one or more data sources, transformation settings to define specific transformation settings to be applied to data records extracted from the one or more data sources, lookup settings to define criteria to look up one or more values that correspond to a key in a lookup table that contains one or more key-value pairs, staging settings to prepare (e.g., buffer) transformed data records for loading into the one or more data sinks, destination settings to define parameters that the ETL system uses to connect to the one or more data sinks, and/or loading settings to define parameters to load transformed data into the one or more data sinks.

Furthermore, in some implementations, when configuring a particular ETL pipeline, the client device may indicate scheduling settings for executing an ETL job operating on the ETL pipeline. For example, in some implementations, the scheduling settings may configure the ETL job and/or one or more tasks related to the ETL job to be executed on-demand, at a particular time, at periodic intervals, and/or when certain triggering criteria are satisfied (e.g., when available resources satisfy a threshold, when a data volume of data records to be extracted, transformed, and/or loaded satisfies a threshold, when a new data source or data sink is connected to the ETL system, and/or when anomalies are detected in the extracted, transformed, and/or loaded data, among other examples). Additionally, or alternatively, the scheduling settings may configure the ETL pipeline in which extraction, transformation, and/or loading tasks are executed. For example, in some implementations, the client device may configure scheduling settings that define dependencies associated with different tasks that are performed within the ETL pipeline to extract, transform, and load data records (e.g., nested ETL jobs or tasks that cannot proceed until one or more ETL jobs or tasks that are earlier in the pipeline have completed) and/or tasks that can be executed in parallel once any preconditions are satisfied.

Accordingly, as further shown in FIG. 1B, and by reference numbers 180-1, 180-2, and 180-3, the ETL system may be configured to execute one or more ETL jobs, and each ETL job may generally include one or more tasks that relate to extracting data records from source tables in the one or more data sources, transforming the data records into a target format, and loading the data records in the target format into one or more tables in the one or more data sinks. For example, as shown by reference number 180-1, the ETL system may be configured to extract data records from the one or more data source(s), which may include structured and/or unstructured data stored in one or more data repositories, cloud environments, on-premises environments, application-specific data repositories, mobile devices, customer relationship management systems, and/or other suitable data sources (e.g., including the query-friendly datasets generated by the event log management system). In some implementations, the one or more data sources may use heterogeneous and/or homogeneous data organizations and/or data formats to store data records in one or more source tables, and the extraction tasks may be configured to ingest data from the data source(s) and convert the extracted data records to a data stream in which the extracted data records have a common format to enable subsequent transformation processing.

Accordingly, as further shown in FIG. 1B, and by reference number 180-2, the ETL system may be configured to perform one or more transformation tasks to apply rules, policies, and/or other functions to the data records extracted from the data source(s) in order to prepare the data records for loading into the data sink(s). For example, in some implementations, the transformation tasks may include data cleansing to remove inconsistencies, resolving missing values, standardization to apply formatting rules to the extracted data records, deduplication to exclude or discard redundant data records, verification to remove unusable data records and/or flag anomalies in the content of the data records, sorting or ordering to organize the data records according to type or other criteria, joining data from multiple data sources, aggregating data to summarize multiple rows of data, and/or transposing or pivoting to convert multiple columns into multiple rows (or vice versa), among other examples. Furthermore, in some implementations, the transformation tasks may include one or more data validation tasks (e.g., sampling data in real-time to verify that transformed data records match an expected output). In such cases, a failed validation may result in a partial or full rejection of the data (or no rejection, depending on context), whereby all, some, or none of the data records may be handed over to the next stage in the ETL pipeline (e.g., loading tasks) depending on the outcome from the validation. Additionally, or alternatively, in a case of a failed data validation, one or more extraction and/or transformation tasks may be re-executed in an effort to correct issues that may have led to the failed data validation. In some implementations, the one or more data records may be stored in one or more staging tables or one or more intermediate sources while the transformation tasks are executed to transform the data records to the target format.

As further shown in FIG. 1B, and by reference number 180-3, the ETL system may be configured to perform one or more loading tasks to insert, into the data sink(s), transformed data records that have been processed by the tasks in the transformation stage of the ETL pipeline.

For example, in some implementations, the loading tasks may be configured to overwrite existing data stored in the data sink(s) with cumulative data and/or to insert new data in a historical form at periodic intervals. Additionally, or alternatively, the loading tasks may be configured to replace, append, and/or supplement data stored in the data sink(s) in a manner that maintains a history and/or audit trail of changes to the data stored in the data sink(s). Furthermore, in some implementations, the loading tasks may be configured to load data records into the data sink(s) all at once based on a full loading configuration and/or at scheduled intervals based on an incremental loading configuration (e.g., depending on available storage and/or processing resources, data volumes to be loaded, and/or other criteria). For example, a full loading configuration may indicate that all data passed from the transformation stage to the loading stage in the ETL pipeline is to be loaded into the data sink(s) as new, unique records, which may be useful for in-depth research purposes. Alternatively, because a full loading configuration may result in exponential growth in a dataset that may be difficult to maintain (e.g., potentially causing a failure in the loading stage of the ETL pipeline), an incremental loading configuration may be used to compare incoming data to data already stored in the data sink(s) and produce additional data records to be loaded into the data sink(s) only for new and unique information. As further shown by reference number 190, a user of the client device may then access requested data via the data sink(s) for any suitable data analytics use case.

As indicated above, FIGS. 1A-1B are provided as an example. Other examples may differ from what is described with regard to FIGS. 1A-1B.

Figure 2:
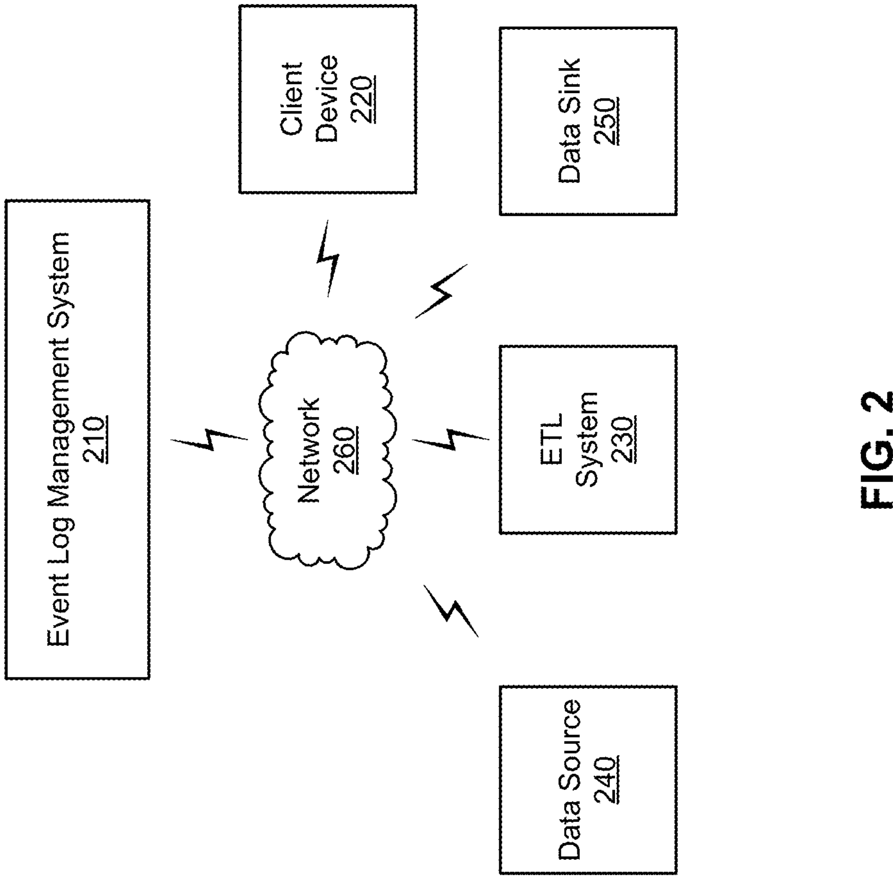
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include an event log management system 210, a client device 220, an ETL system 230, a data source 240, a data sink 250, and a network 260. Devices of environment 200 may interconnect via wired connections, wireless connections, or a combination of wired and wireless connections.

The event log management system 210 includes one or more devices capable of receiving, generating, storing, processing, providing, and/or routing information associated with cleaning and/or organizing schemaless semi-structured data to enable ETL processing on a query-friendly dataset that is generated from the schemaless semi-structured data, as described in more detail elsewhere herein. The event log management system 210 may include a communication device and/or a computing device. For example, the event log management system 210 may include a server, such as an application server, a client server, a web server, a database server, a host server, a proxy server, a virtual server (e.g., executing on computing hardware), or a server in a cloud computing system. In some implementations, the event log management system 210 includes computing hardware used in a cloud computing environment.

The client device 220 includes one or more devices capable of receiving, generating, storing, processing, and/or providing information associated with cleaning and/or organizing schemaless semi-structured data to enable ETL processing on a query-friendly dataset that is generated from the schemaless semi-structured data, as described elsewhere herein. For example, in some implementations, the client device 220 may be used to provide, to the event log management system 210, one or more registration parameters related to an ETL use case for which the event log management system 210 is to generate a query-friendly dataset. The client device 220 may include a communication device and/or a computing device. For example, the client device 220 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The ETL system 230 includes one or more devices capable of receiving, generating, storing, processing, providing, and/or routing information associated with one or more ETL jobs that are scheduled in the ETL system 230, as described elsewhere herein. For example, the ETL system 230 may perform one or more ETL jobs to extract data from the data source 240, transform the extracted data into a target format, and load the transformed data into the data sink 250. The ETL system 230 may include a communication device and/or a computing device. For example, the ETL system 230 may include a server, such as an application server, a client server, a web server, a database server, a host server, a proxy server, a virtual server (e.g., executing on computing hardware), or a server in a cloud computing system. In some implementations, the ETL system 230 includes computing hardware used in a cloud computing environment.

The data source 240 includes one or more devices capable of receiving, generating, storing, processing, and/or providing information associated with one or more ETL jobs, as described elsewhere herein. For example, in some implementations, the data source 240 may store one or more query-friendly datasets that are generated by the event log management system 210 from schemaless semi-structured data, and may provide the one or more query-friendly datasets to the ETL system 230 for further processing (e.g., transformation and loading to the data sink 250). The data source 240 may include a communication device and/or a computing device. For example, the data source 240 may include a database, a cloud and/or on-premises environment, a data warehouse, a customer relationship management system, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 240 may communicate with one or more other devices of environment 200, as described elsewhere herein.

The data sink 250 includes one or more devices capable of receiving, generating, storing, processing, and/or providing information associated with one or more ETL jobs, as described in more detail elsewhere herein. For example, in some implementations, the event log management system 210 may transform one or more query-friendly datasets that are extracted from the data source 240 into a target format, and the transformed datasets may be stored in the data sink 250 and/or made accessible to the client device 220 through the data sink 250 for any suitable data analytics use case. The data sink 250 may include a communication device and/or a computing device. For example, the data sink 250 may include a database, a data warehouse, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data sink 250 may communicate with one or more other devices of environment 200, as described elsewhere herein.

The network 260 includes one or more wired and/or wireless networks. For example, the network 260 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 260 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
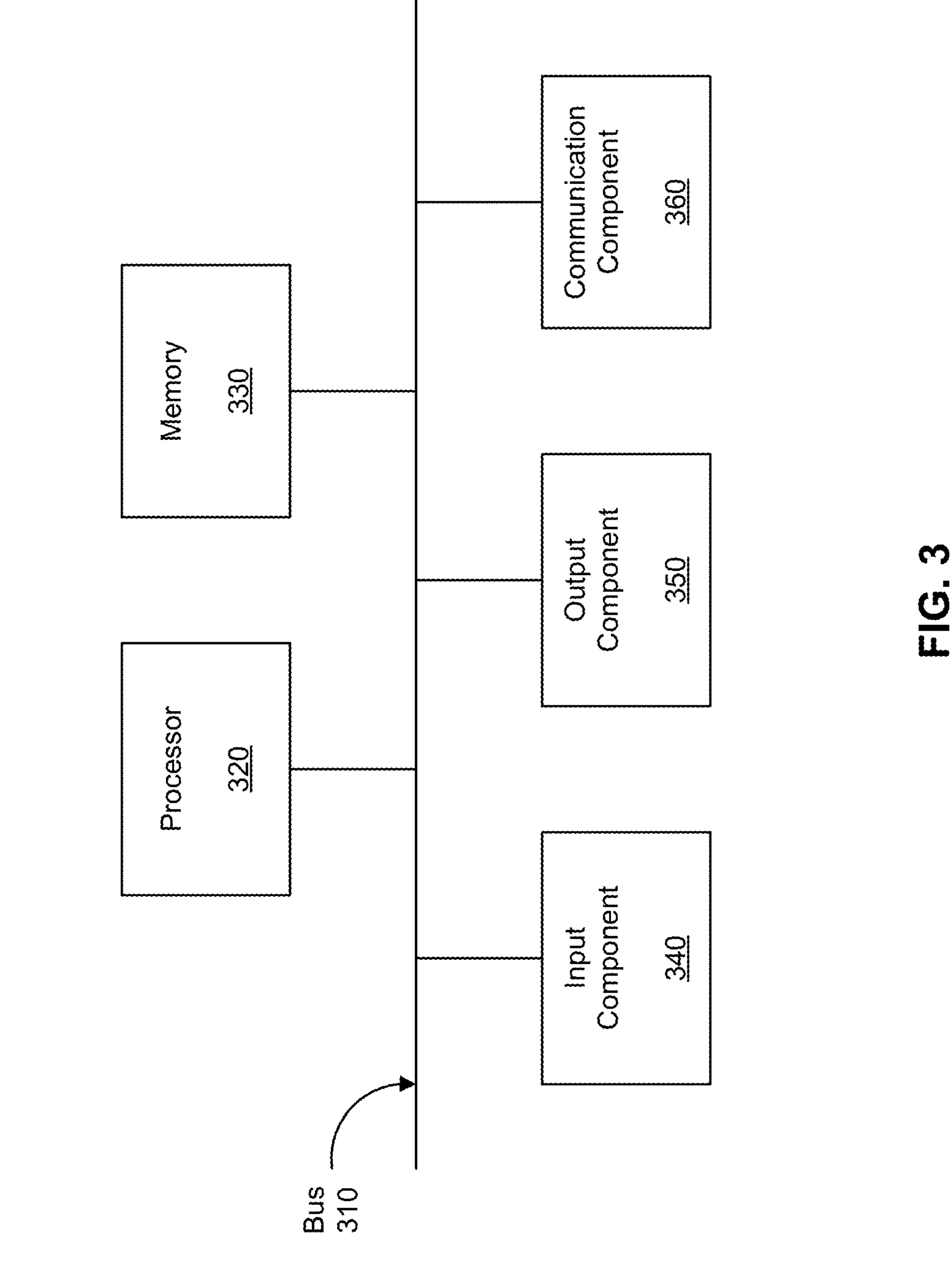
FIG. 3 is a diagram of example components of one or more devices of FIG. 2, in accordance with some embodiments of the present disclosure.

FIG. 3 is a diagram of example components of a device 300 associated with cleaning and organizing schemaless semi-structured data for ETL processing. Device 300 may correspond to event log management system 210, client device 220, ETL system 230, data source 240, and/or data sink 250. In some implementations, event log management system 210, client device 220, ETL system 230, data source 240, and/or data sink 250 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
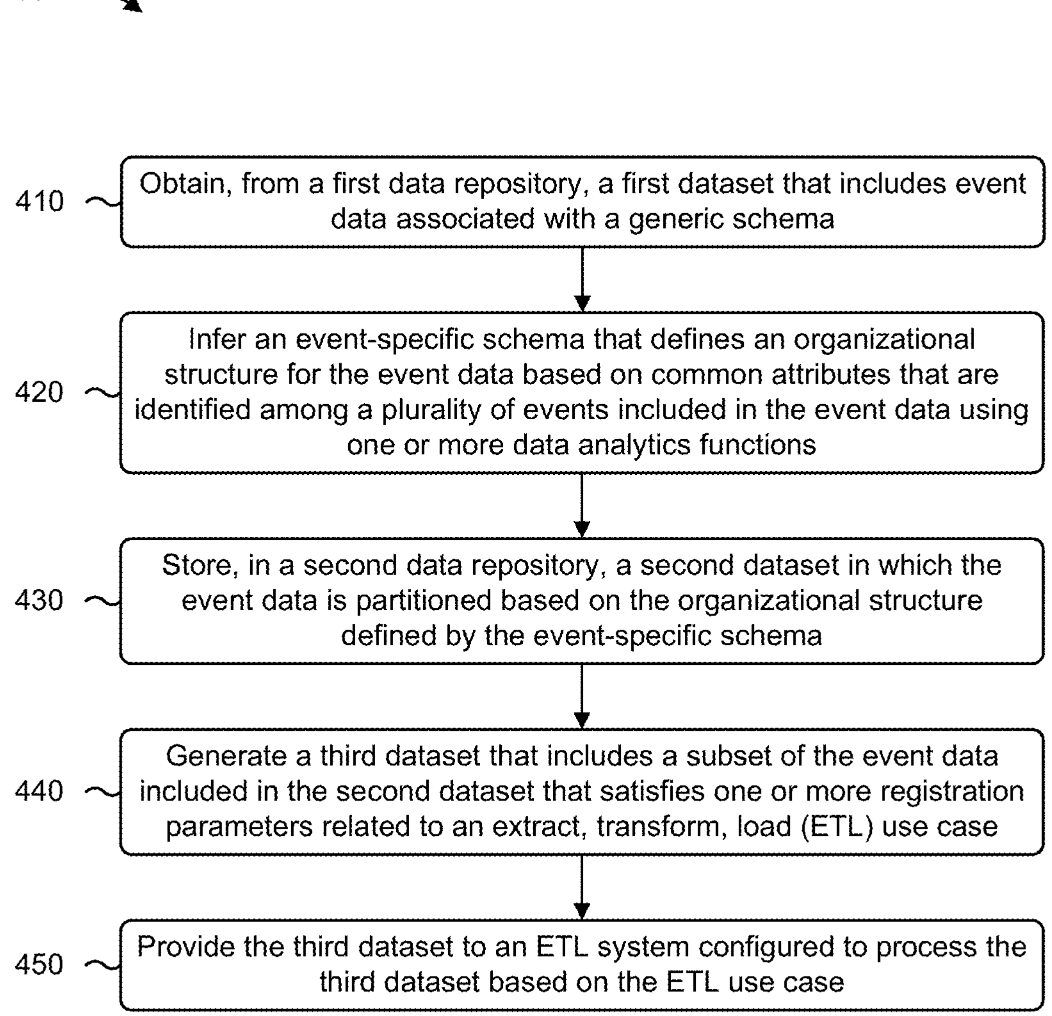
FIG. 4 is a flowchart of an example process relating to cleaning and organizing schemaless semi-structured data for ETL processing, in accordance with some embodiments of the present disclosure.

FIG. 4 is a flowchart of an example process 400 associated with cleaning and organizing schemaless semi-structured data for ETL processing. In some implementations, one or more process blocks of FIG. 4 may be performed by the event log management system 210. In some implementations, one or more process blocks of FIG. 4 may be performed by another device or a group of devices separate from or including the event log management system 210, such as the client device 220, the ETL system 230, the data source 240, and/or the data sink 250. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining, from a first data repository, a first dataset that includes event data associated with a generic schema (block 410). For example, the event log management system 210 (e.g., using processor 320, memory 330, and/or communication component 360) may obtain, from a first data repository, a first dataset that includes event data associated with a generic schema, as described above in connection with reference number 110 in FIG. 1A and/or reference number 120 in FIG. 1B. As an example, a plurality of applications may publish event logs that relate to API events associated with different event names (e.g., E1 events, E2 events, E3 events, or the like) to a common data repository that is used as a landing zone for heterogeneous data sources, where the data related to the API events may be represented using a generic schema, such as a JSON string or blob format. Accordingly, the event log management system 210 may obtain a dataset to be converted from the generic schema to a query-friendly dataset from the common data repository used as the landing zone.

As further shown in FIG. 4, process 400 may include inferring an event-specific schema that defines an organizational structure for the event data based on common attributes that are identified among a plurality of events included in the event data using one or more data analytics functions (block 420). For example, the event log management system 210 (e.g., using processor 320 and/or memory 330) may infer an event-specific schema that defines an organizational structure for the event data based on common attributes that are identified among a plurality of events included in the event data using one or more data analytics functions, as described above in connection with reference number 130 in FIG. 1B. As an example, the event log management system may use one or more schema inference functions associated with an Apache Spark framework or another suitable data analytics platform to identify tags, markers, delimiters, and/or other attributes that are used to separate semantic elements and/or define hierarchies and/or relationships among the attributes associated with the events, which may be analyzed to infer the event-specific schema that defines the organizational structure for the event data.

As further shown in FIG. 4, process 400 may include storing, in a second data repository, a second dataset in which the event data is partitioned based on the organizational structure defined by the event-specific schema (block 430). For example, the event log management system 210 (e.g., using processor 320, memory 330, and/or communication component 360) may store, in a second data repository, a second dataset in which the event data is partitioned based on the organizational structure defined by the event-specific schema, as described above in connection with reference number 130 in FIG. 1B. As an example, the event log data published by heterogeneous applications may be stored together in a common data location in the first data repository, and the organizational structure associated with the inferred event-specific schema may be used to partition the schemaless semi-structured data into smaller datasets that can be analyzed to enable more granular analysis. For example, in a case where the applications publish API events associated with different event names, such as E1 events, E2 events, and E3 events, the event log management system may partition the API events into respective folders for E1 events, E2 events, and E3 events, which may be further organized based on the inferred event-specific schema associated with each respective partition.

As further shown in FIG. 4, process 400 may include generating a third dataset that includes a subset of the event data included in the second dataset that satisfies one or more registration parameters related to an ETL use case (block 440). For example, the event log management system 210 (e.g., using processor 320 and/or memory 330) may generate a third dataset that includes a subset of the event data included in the second dataset that satisfies one or more registration parameters related to an ETL use case, as described above in connection with reference numbers 140, 150, and/or 160 in FIG. 1B. As an example, the event log management system may generate an event intelligence report that exposes the inferred event-specific schema information to one or more client devices, which may then provide the one or more registration parameters related to the ETL use case to configure one or more query-friendly datasets that are to be generated for the ETL use case.

As further shown in FIG. 4, process 400 may include providing the third dataset to an ETL system configured to process the third dataset based on the ETL use case (block 450). For example, the event log management system 210 (e.g., using processor 320, memory 330, and/or communication component 360) may provide the third dataset to an ETL system configured to process the third dataset based on the ETL use case, as described above in connection with reference numbers 170, 180-1, 180-2, and/or 180-3 in FIG. 1B. As an example, the query-friendly dataset that is generated for a specific ETL use case may be provided to one or more data sources (e.g., a relational database, such as Snowflake), and an ETL system may then extract appropriate data records that may include data in the query-friendly dataset, transform the extracted data records to a target format, and load the transformed data records to a data sink such that a client device may access requested data from the data sink for any suitable data analytics use case.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1B. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:

one or more memories; and one or more processors, coupled to the one or more memories, configured to:

obtain event data including a plurality of events associated with transaction data, wherein the event data is associated with a generic schema;

infer an event-specific schema, for the event data, that defines an organizational structure for the event data based on common attributes among the plurality of events, wherein the plurality of events include actions or occurrences in a data ecosystem;

store a second dataset in which the event data is partitioned using the organizational structure defined by the event-specific schema;

receive one or more parameters that define an extract, transform, load (ETL) pipeline use case;

generate, based on the received one or more parameters, a third dataset to be processed by the ETL pipeline, wherein the third dataset includes a subset of the event data included in the second dataset that satisfies one or more registration parameters related to an ETL use case, and wherein the third dataset to be processed by the ETL pipeline comprises data to be extracted by an ETL system, transformed into a target data format, and loaded where the data is made available for one or more data analytics use cases; and provide the third dataset to the ETL system configured to process the third dataset into the ETL pipeline and process the third dataset based on the ETL use case.

2. The system of claim 1, wherein the one or more processors are further configured to:

generate an event intelligence report that includes information related to the common attributes or information related to the event-specific schema.

3. The system of claim 1, wherein the common attributes are identified among the plurality of events using one or more data analytics functions.

4. The system of claim 1, wherein the one or more processors are further configured to:

store the second dataset in a data repository.

5. The system of claim 1, wherein the second dataset is compatible with a database query format associated with one or more relational database management systems.

6. The system of claim 1, wherein the plurality of events is associated with one or more of:

interactions with a plurality of applications that generated the plurality of events, or actions performed by the plurality of applications.

7. The system of claim 1, wherein the second dataset is retained in a data repository for a time period.

8. The system of claim 7, wherein the one or more processors are further configured to:

store the third dataset in an additional data repository for an additional time period that is longer than the time period.

9. A method, comprising:

obtaining, by a system, event data including a plurality of events associated with transaction data, wherein the event data is associated with a generic schema;

inferring, by a system, an event-specific schema for the event data, wherein the event-specific schema defines an organizational structure for the event data based on common attributes among the plurality of events, and wherein the plurality of events include actions or occurrences in a data ecosystem;

storing, by the system, a second dataset in which the event data is partitioned using the organizational structure defined by the event-specific schema;

receiving, by the system, one or more parameters that define an extract, transform, load (ETL) pipeline use case;

generating, by the system and based on the received one or more parameters, a third dataset to be processed by the ETL pipeline, wherein the third dataset includes a subset of the event data included in the second dataset that satisfies one or more registration parameters related to an ETL use case, and wherein the third dataset to be processed by the ETL pipeline comprises data to be extracted by an ETL system, transformed into a target data format, and loaded where the data is made available for one or more data analytics use cases; and providing, by the system, the third dataset to the ETL system configured to process the third dataset into the ETL pipeline and process the third dataset based on the ETL use case.

10. The method of claim 9, wherein the generic schema is associated with a data format that supports schema variability among a plurality of applications.

11. The method of claim 9, further comprising: storing the second dataset in a data repository.

12. The method of claim 11, wherein the second dataset is retained in the data repository for a time period.

13. The method of claim 9, wherein the common attributes are identified among the plurality of events using one or more data analytics functions.

14. A non-transitory computer-readable medium storing a set of instructions, the set of instructions comprising:

one or more instructions that, when executed by one or more processors of a system, cause the system to:

obtain event data including a plurality of events associated with transaction data, wherein the event data is associated with a generic schema;

infer an event-specific schema, for the event data, that defines an organizational structure for the event data based on common attributes among the plurality of events associated with transaction data, wherein the plurality of events include actions or occurrences in a data ecosystem;

store a second dataset in which the event data is partitioned using the organizational structure defined by the event-specific schema;

receive one or more parameters that define an extract, transform, load (ETL) pipeline use case;

generate, based on the received one or more parameters, a third dataset to be ingested into an ETL pipeline, wherein the third dataset includes a subset of the event data included in the second dataset that satisfies one or more registration parameters related to an ETL use case, and wherein the third dataset to be processed by the ETL pipeline comprises data to be extracted by an ETL system, transformed into a target data format, and loaded where the data is made available for one or more data analytics use cases;

provide the third dataset to the ETL system configured to process the third dataset into the ETL pipeline and process the third dataset based on the ETL use case; and generate a report that includes information related to the common attributes or information related to the event-specific schema.

15. The non-transitory computer-readable medium of claim 14, wherein the one or more instructions further cause the system to:

provide the report to a client device.

16. The non-transitory computer-readable medium of claim 14, wherein the generic schema is associated with a data format that supports schema variability among a plurality of applications.

17. The non-transitory computer-readable medium of claim 14, wherein the common attributes are identified among the plurality of events using one or more data analytics functions.

18. The non-transitory computer-readable medium of claim 14, wherein the plurality of events is associated with interactions with a plurality of applications that generated the plurality of events.

19. The non-transitory computer-readable medium of claim 14, wherein the plurality of events is associated with actions performed by a plurality of applications that generated the plurality of events.

20. The non-transitory computer-readable medium of claim 14, wherein: the second dataset is retained in a data repository for a time period, and the third dataset is retained in an additional data repository for an additional time period that is longer than the time period.

* * * * *